No. 871,165. PATENTED NOV. 19, 1907.
W. FIELDING.
SPINDLE LUBRICATOR.
APPLICATION FILED MAR. 18, 1907.
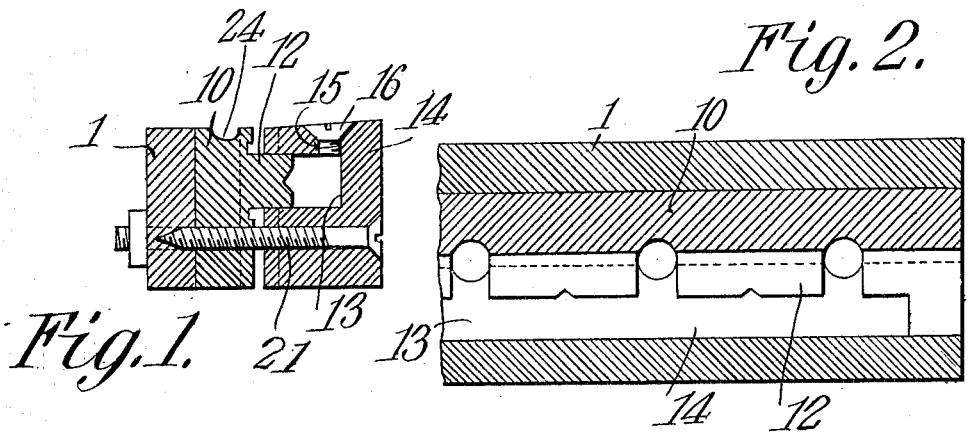
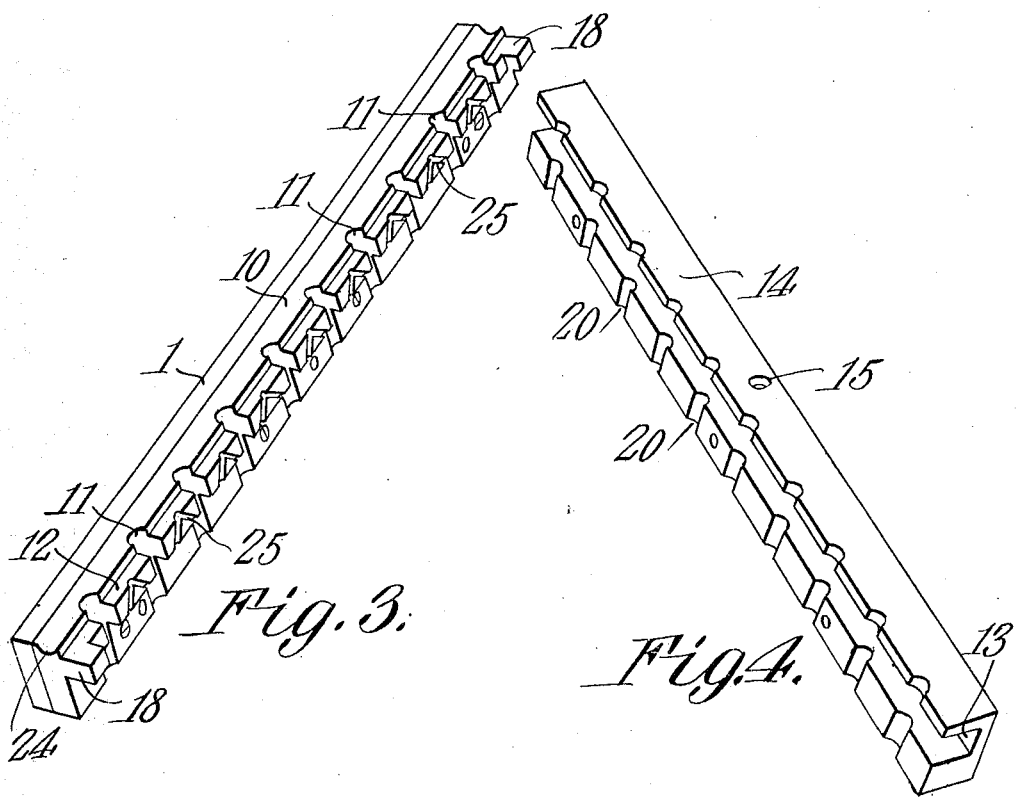
WITNESSES:
William Fielding,
INVENTOR.
By C. A. Snow & Co.
ATTORNEYS

UNITED STATES PATENT OFFICE.

WILLIAM FIELDING, OF LEWISTON, MAINE.

SPINDLE-LUBRICATOR.

No. 871,165. Specification of Letters Patent. Patented Nov. 19, 1907.

Application filed March 18, 1907. Serial No. 363,076.

*To all whom it may concern:*

Be it known that I, WILLIAM FIELDING, a citizen of the United States, residing at Lewiston, in the county of Androscoggin and State of Maine, have invented a new and useful Spindle-Lubricator, of which the following is a specification.

This invention relates to bearings and lubricating devices for the spindles of spinning frames and the like, and has for its principal object to provide a novel form of bearing having a lubricant reservoir common to a series of spindles, the reservoir and the bearing being so constructed that frequent lubrication will not be necessary.

A further object of the invention is to provide a bearing and lubricant reservoir of such construction that the lubricant will be automatically distributed from the reservoir to a large number of spindles, and which will prevent loss of lubricant and the accumulation of dirt and dust in the lubricant reservoir or around or adjacent to the spindle.

A still further object of the invention is to provide an improved bearing from which broken or bent spindles may be readily removed.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a transverse sectional view of a spindle bearing constructed in accordance with the invention. Fig. 2 is a sectional plan view of a portion of the same. Fig. 3 is a detail perspective view of one section of the bearing. Fig. 4 is a similar view of the opposite section of the bearing.

Similar numerals of reference are employed to indicate corresponding parts throughout the several figures of the drawings.

The carriage 1 is generally formed of iron or steel and to this carriage is secured a collar board 10 formed of brass or other suitable material, the collar board being provided with a number of notches 11 generally ten in number for the reception of ten spindles, the bearings which form the subject of the present invention being each designed to hold a series of ten, more or less, spindles.

Projecting from the forward face of the collar board is a rib 12 that fits within a groove 13 formed in the outer section 14 of the brass collar board, this groove 13 constituting a lubricant reservoir to which lubricant is supplied through an opening 15, the lubricant being preferably in the form of melted tallow or similar material, which will solidify when cooled. The opening 15 is provided with a threaded closing plug 16 which is placed in position after the reservoir is filled in order to prevent the entrance of dust and dirt. The ends of the reservoir are formed by suitable lugs 18 that project from the end portions of the rib 12 in order to prevent the escape of the lubricant.

The inner face of the outer section 14 of the collar board is provided with notches 20 of a number corresponding to the number of notches 11, and these notches are made in pairs that constitute bearings for the spindles. The two sections of the collar board are held in proper relative position by securing screws 21 or similar members which may be tightened for the purpose of taking up wear on the bearings or spindles, as may be necessary from time to time.

It will be observed that all of the bearing notches 11 open directly into the lubricant reservoir, so that one side of the bearing is in constant communication with the reservoir, and the lubricant may have free access to the spindle, and in order that the lubricant may be better distributed, the outer face of the rib 12 is provided with obliquely disposed grooves 25 which serve to some extent to direct the lubricant in the direction of the spindles.

The wearing side of the collar board or spindle is that side nearest the carriage 1, owing to the natural pull of the bands on the spindle whirls. In order to keep this side of the spindle thoroughly lubricated, the upper edge of the portion 10 is provided with a collecting groove 24 for the grease, and the outer portion of the collar board has an inclined top in order that any grease which may collect may run by gravity down to the groove.

The construction is such that all wear may be readily taken up, and in case of a broken or bent spindle the outer section of the collar board may be readily removed in order that the spindle may be replaced.

I claim:—

1. In a device of the class specified, a two part collar board having spindle bearing recesses, the sections of the collar board having interfitting ribbed and grooved portions constituting a lubricant reservoir.

2. In a device of the class specified, a two part collar board notched to form spindle bearings, one section of the collar board having a groove constituting a lubricant reservoir, and the other section having a rib that fits partly within said groove.

3. In a device of the class specified, a two part collar board notched to form spindle bearings, one of the sections of the collar board being provided with a projecting rib, the outer face of which has inclined recesses, the opposite section of the collar board having a rib receiving groove that constitutes a lubricant reservoir.

4. In a device of the class specified, a two part collar board notched to form spindle bearings, one section of the collar board having a projecting rib, the outer face of which has obliquely disposed grooves, the opposite section of the collar board having a rib receiving groove constituting a lubricant reservoir, lugs projecting from the face of the rib and closing the ends of the groove, and means for adjusting the sections relatively to each other to take up wear.

5. In a device of the class specified, a two part collar board, the upper face of one of the collar board members being provided with a longitudinal groove, and the other member being inclined in the direction of such groove, substantially as and for the purpose specified.

In testimony that I claim the foregoing as my own, I have hereto affixed my signature in the presence of two witnesses.

WILLIAM FIELDING.

Witnesses:
   Mrs. M. C. Hathaway,
   Napoleon Charest.